F. R. SCOTT.
CLAMP FOR FRUIT BASKET COVERS.
APPLICATION FILED MAY 14, 1912.
1,126,886.
Patented Feb. 2, 1915.
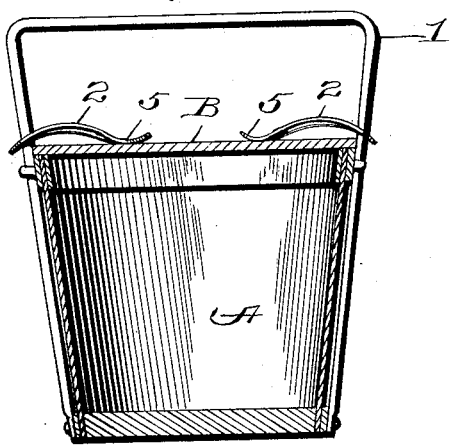
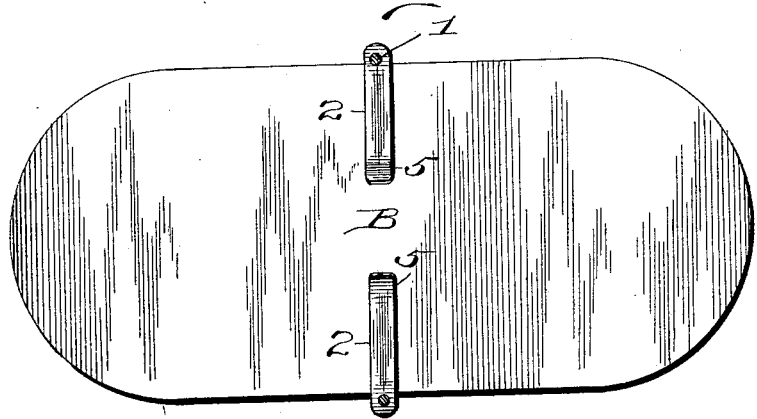
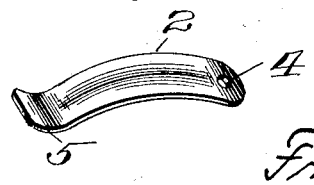

UNITED STATES PATENT OFFICE.

FRANK R. SCOTT, OF HANOVER, NEW YORK.

CLAMP FOR FRUIT-BASKET COVERS.

1,126,886. Specification of Letters Patent. Patented Feb. 2, 1915.

Application filed May 14, 1912. Serial No. 697,246.

*To all whom it may concern:*

Be it known that I, FRANK R. SCOTT, a citizen of the United States, residing in the town of Hanover, in the county of Chautauqua and State of New York, have invented certain new and useful Improvements in Clamps for Fruit-Basket Covers, of which the following is a specification.

My invention relates to devices for clamping the covers on fruit baskets and has for its object the provision of a clamp slidably mounted on the handle of a basket and so constructed that it coöperates with the handle to prevent accidental removal of the clamp when in position.

My invention will be described in detail hereinafter and illustrated in the accompanying drawings, in which—

Figure 1 is a cross sectional view of a fruit basket showing the preferred embodiment of my invention in position thereon; Fig. 2, a plan view of a basket showing the handle in section; and Fig. 3, a detail view of one of the clamping members removed from the handle.

In securing the covers to fruit baskets, it is the usual practice to secure the cover in position by means of wire staples engaging the cover and the side of the basket, and when it is desired to remove the cover it is necessary to withdraw the staples, which cannot afterward conveniently be replaced by hand, so that the cover, after displaying the fruit in the basket, is loose and oftentimes becomes misplaced, causing the fruit to become soiled and making it partially if not entirely unsalable.

My invention contemplates the employment of my improved means for securing the cover on the basket to enable the salesman to remove the cover to display the fruit, and afterward refasten the cover in position as at first, to enable him to have the basket in its original condition for display to other customers, or to fasten the cover in position for the customer to whom the fruit is sold.

In the drawings is shown my improved cover clamp in position, and similar reference characters will be used to designate corresponding parts throughout the several views.

A indicates a basket for containing fruit or the like, and B the cover usually employed to cover the top of the basket.

The handle 1 of my improved basket is formed of a round wire secured to the sides of the basket, and mounted thereon, as shown in Figs. 1 and 2, are clamping members consisting of pieces of spring steel or like rigid material, that are indicated at 2, and formed bowed longitudinally and also curved transversely with the edges extending upwardly. One of the terminals of each piece of metal is provided with an opening adjacent thereto designated 4 that slidably engages the wire bail while the other terminal of each piece of metal is bent upwardly as shown at 5 to form an engaging portion for the top of the cover B.

As shown in the drawings, the opposite sides of the handle are outwardly inclined and the clamping plates or members adjustably mounted upon the opposite outwardly inclined sides of the handle and resting upon the cover, exert a resilient pressure upon the same at the opposite sides thereof, intermediate the ends of the cover and slightly inwardly of the longitudinal edges thereof to securely clamp the cover upon the basket and press both sides thereof in close engagement with the upper edge of the basket without the necessity of employing staples or other securing members as secured through the basket and the cover. Such fastening means must be bent out of shape when removed to display the contents of the basket and can not be securely fastened in place again to clamp the cover upon the basket, without the use of a hammer or other special tool. It will therefore be seen that when such fastening members are employed as has heretofore been the practice, and the basket 1 opened to display the contents thereof, it is impossible to securely clamp the cover in position again to protect the contents thereof and prevent the same from spoiling. The means employed by applicant, however, can be readily moved upwardly or downwardly upon the outwardly inclined sides of the handle to permit either or both sides of the basket or an end thereof to be raised or permit the cover to be moved longitudinally upon the basket for the purpose of displaying the contents thereof. The means employed by applicant may then be again moved downwardly upon the cover after the same has been returned to proper position to engage said means with said cover and press the latter lightly upon the basket and securely retain both the sides and ends thereof in engagement with the upper edge of the basket. It will also be evident that as applicant's clamping means or members are moved upwardly upon the outwardly inclined sides of the handle, they will bind upon the same and stay in the position in which they are placed upon the handle and not slide down again upon the cover. The farther down they are moved upon the sides of the handle, however, the farther in they will move upon the cover and the tighter will they clamp the cover in position and the strain of the cover upon the clamping members will serve to tighten the same upon the outwardly inclined sides of the handle.

It will be understood that by having the clamping members 1 formed bowed longitudinally as stated, that after the cover has been placed in position and the clamping members pressed into engagement therewith, that the downwardly extending outer ends of the members that engage the handle or bail 1, are securely clamped by the walls of the openings 4 and prevented from sliding upwardly on the handle to accidentally displace the clamping members from engagement with the cover so that it is securely held in position on the basket. Should, however, it be desired to remove the contents of the basket, the clamping members may be released from engagement with the cover by pressing their outer ends upwardly to release them from engagement with the handle or bail, and should it be desired to replace the cover it may be securely held in position by pressing the portions of the members within the bail downwardly.

Having thus described my invention what I claim is:

In a device of the class described, the combination with a fruit basket, a cover mounted upon the same, and a transverse wire handle including inwardly inclined sides; of separate clamping members adjustably mounted upon each side of said handle and resting upon said cover to exert a resilient pressure upon the latter at the opposite sides thereof intermediate the ends of the cover and slightly inwardly of the longitudinal edges thereof.

In testimony whereof I affix my signature in presence of two witnesses.

FRANK R. SCOTT.

Witnesses:
FREDERICK L. CRANSON,
JOHN J. SHARP.

Copies of this patent may be obtained for five cents each, by addressing the "Commissioner of Patents, Washington, D. C."